United States Patent [19]

Oka et al.

[11] Patent Number: 4,663,262

[45] Date of Patent: May 5, 1987

[54] CARRIER FOR USE IN ELECTROPHOTOGRAPHIC DEVELOPERS

[75] Inventors: Kazuyoshi Oka; Mitsuhiro Katayama; Toshihiko Kohno, all of Gunma, Japan; Ulf Engström; Svenn-Erik Larssen, both of Höganäs, Sweden

[73] Assignees: Kanto Denka Kogyo Co., Ltd., Tokyo, Japan; Hoganas AB, Höganäs, Sweden

[21] Appl. No.: 813,519

[22] Filed: Dec. 26, 1985

[30] Foreign Application Priority Data

Dec. 25, 1984 [JP] Japan ................................. 59-278627

[51] Int. Cl.⁴ .......................... G03G 9/10; C04B 35/26
[52] U.S. Cl. .................................. 430/108; 252/62.56
[58] Field of Search ....................... 430/108; 252/62.56

[56] References Cited

U.S. PATENT DOCUMENTS 4,265,995  5/1981  Mammino ....................... 430/108 X
4,287,287  9/1981  Bolte et al. ..................... 430/108 X

*Primary Examiner*—Roland E. Martin
*Attorney, Agent, or Firm*—Browdy and Neimark

[57] ABSTRACT

A noval carrier powder for electrophotographic developers is provided. The carrier powder comprises spherical magnetite particles having a wustite (FeO) content of less than 10% by weight, a particle diameter of 30–200 $\mu$m and a surface porosity of less than 20%.

11 Claims, No Drawings

CARRIER FOR USE IN ELECTROPHOTOGRAPHIC DEVELOPERS

FIELD OF THE INVENTION

This invention relates to particulate magnetite materials useful as a carrier component in electrophotographic developers, in particular two-component developers comprising the carrier component together with a toner component.

BACKGROUND OF THE INVENTION

In electrophotography, the electrostatic image formed on the photoconductor is developed by the magnetic brush method using either the so called "one-component" developer or "two-component" developer. Usually, the two-component developer system comprises a mixture of relatively fine particles of a toner and relatively coarse particles of a carrier. The toner particles are held on the carrier particles by the electrostatic forces of opposite polarities which are generated by friction of the particles. When the developer comes into contact with an electrostatic latent image formed on the photosensitive plate, the toner particles are attracted by the image and thus make the latter visible. The thus developed image is then transferred onto a recording medium, such as a paper sheet. In the process, therefore, the toner particles should be charged with an accurately controlled amount of static electricity so that they are preferentially attracted to the electrostatically imaged area of the photosensitive plate.

Thus, in turn, the carrier which is used in combination with the toner should fullfil the following criteria: The carrier should have an appropriate triboelectric property which enables it to electrostatically hold the toner particles and to transfer the held toner particles to the electrostatic latent image on the photosensitive plate when contacted. The carrier should have a sufficient mechanical strength to protect the carrier particles from breaking or cracking. The carrier particles should exhibit a good fluidity. The carrier particles should be uniform in their electric and magnetic properties. The carrier should be stable with respect to changes in the environmental conditions, such as humidity. The carrier particles should have a sufficient durability to ensure an acceptable lifetime.

Hitherto, the carrier employed has been selected from a variety of materials. A typical example which has been most widely employed is iron powder. In some cases, the surface of iron is oxidized and/or coated with a resinous material to improve its properties before use. However, iron carriers of this type have not necessarily been satisfactory in respect to the resulting copy quality and the durability.

Ferrite, an oxidic magnetic material, has also been used as a carrier material. Although this ferrite carrier has an acceptable level of durability, its stability with respect to changes in environmental conditions is not sufficient so that the resulting copy quality tends to vary when external conditions such as humidity change. Since ferrite has a high electric resistivity, the copying latitude of the ferrite carrier is narrow and the carrier tends to produce a mono-toned copy. Ferrite may be coated with a resinous material to make it less sensitive to the changes of such environmental conditions as humidity. However, this is not preferred because the coating will increase the resistivity and make the latitude even narrower and also will add to the production costs.

SUMMARY OF THE INVENTION

Accordingly, an object of the present invention is to provide a novel carrier for electrophotography which eliminates the disadvantages of the conventional carriers.

Another object of the present is to provide a long-life carrier for electrophotography which is superior to the conventional carriers in its image-developing properties.

DETAILED DESCRIPTION OF THE INVENTION

According to the present invention there is provided an electrophotographic carrier powder comprising magnetite with a substantially spherical particle shape, characterized in that the carrier powder has a particle diameter of from 30 to 200 μm, contains wustite (FeO) in a proportion of less than 10%, preferably less than 3% by weight and has a surface porosity of less than 20%, preferably less than 10%.

The spherical magnetite powder according to the present invention is characterized by the fact that it has an electrical resistivity lower than that of ferrite. Therefore, the resistivity may be optionally varied over a wide range by coating the powder with a suitable resinous material. Also the magnetite powder may be surface-oxidized to increase the resistivity prior to coating with the resinous material. The surface-oxidation may be effected by any known method. By these means for controlling the resistivity, the product carrier powder may be made to conform to the requirements of any type of copying machine. The spherical magnetite powder exhibits a good fluidity due to its shape. The spherical magnetite powder has a bulk density lower than that of a similarly sized spherical iron powder. This lower bulk density contributes to an improvement in the durability of the carrier.

The spherical magnetite powder may be produced by the following general procedure:

Magnetite powder is formed into spherical agglomerates which are then calcined at a predetermined temperature under a specific atmosphere. The calcined granules are suitably cracked or dispersed and then classified into a desired size distribution. Because the spherical agglomerates are formed with a binder material which is effective for reducing the raw magnetite ($Fe_3O_4$) to wustite (FeO), the magnetite is partially converted to wustite during the calcination to give a product magnetite usually containing 15–20% of wustite. It has been found that if the magnetite contains wustite in a proportion above a certain level, the magnetic properties are disadvantageously impaired. For example, as the level of magnetic saturation is decreased due to the presence of excessive wustite, the carrier particles are undesirably scattered from the magnetic brush in the copying machine, resulting in serious copy defects, such as "white spots" in the solid part of the copy image and "missing letters" in the case of copying of texts.

We have found that a magnetite powder containing less than 10%, preferably less than 3%, by weight of wustite is suitable for use as a carrier in the electrophotographic developers. We have also found that a magnetite powder of such a desirable wustite content may be prepared by controlling the temperature and the composition of the atmosphere during the cooling step after the calcination.

The content of wustite may be determined by the X-ray diffraction technique and may be calculated by the following equation:

$$\text{FeO (\%)} = \frac{S_W}{S_M + S_W} \times 100$$

wherein, $S_M$ is the area of the X-ray diffraction pattern of the highest intensity corresponding to magnetite (Fe$_3$O$_4$) and $S_W$ is the area of the pattern of the highest intensity corresponding to wustite (FeO).

The spherical magnetite powder according to the present invention should preferably have a particle diameter of 30 to 300 μm.

As hereinbefore mentioned, in order to appropriately control the electrical resistivity, the spherical magnetite powder may be surface-oxidized and/or coated with a resinous material.

It has been found that the surface porosity of the magnetite particles should fall within a specific range from both the technical and economical view points. If the particles are excessively porous before the surface-oxidation step, the oxidation would uncontrollably extend from the surface region deeply into the core region to deteriorate the magnetic properties of the product carrier, resulting in poor copy quality. Further, in such a case, the excessively porous particles will pick up an unduly large amount of resinous material during the coating step, thus adding to the production costs. Therefore, the surface porosity of the magnetite particles should be less than 20%, preferably less than 10% by volume.

The surface porosity was measured by mercury penetration through the carrier powder using "Porosimetro Mod 200" manufactured by Carlo Erba Company.

The spherical magnetite containing less than 10% by weight of wustite and having a particle diameter of 30 to 100 μm and a surface porosity of less than 20% may be coated with a resinous material. The coating is accomplished by, for example, dipping the magnetite powder in a solution of the resinous material in an organic solvent such as methyl ethyl ketone, toluene, xylene, n-butanol, methylcyclohexane or methyl isobutyl ketone, or by spraying such a resinous solution over a fluidized mass of the magnetite powder. The thus resin-coated powder may be subjected to a suitable heat treatment, if necessary or desired, depending on the nature of the used resinous material. The nature of the resinous materials used for coating the magnetite carrier is not critical, provided that they are soluble in the commonly used organic solvents. The optimum quantity of the resinous material to be coated on the carrier is governed by the nature of the resin and by the type of the particular copying machine in which the carrier product will be used. Where typical resins, such as phenolic resins, acrylic resins and silicone resins are employed, the preferred quantity is 0.1 to 3% on the basis of weight of the magnetite powder material.

The present invention will be further illustrated with reference to the following experimental Examples.

EXAMPLE 1

Four samples A–D of the spherical magnetite powders containing 19, 13, 8 and 2% of wustite were coated with an acrylic resin in a proportion of 1% by weight of the powder. The samples had a particle diameter of 75–150 μm.

Each of the resin-coated magnetite carriers was weighed in an amount of 970 grams into a one-liter polyethylene bottle and mixed therein for 1 hour at 75 r.p.m. with 30 grams of a commercially available, negatively chargeable toner for the magnetic brush process, to give a developer.

Each of the developers was used for continuously developing a latent image formed on an Se photosensitive plate, and the degree of "carrier deposition onto the photo conductor" was observed. The results are shown in Table 1. The carriers had magnetic saturation values as shown in Table 1. It is desirable for the instant purpose that the magnetic saturation be high.

TABLE 1

| Samples | FeO (%) | Magnetic Saturation $\sigma_S$ (emu/gr) | Apparent Density (grs/cm$^3$) | Carrier Deposition (white spots/copy) |
|---|---|---|---|---|
| A | 19 | 63.2 | 2.31 | 50–60 |
| B | 13 | 70.7 | 2.37 | 7–8 |
| C | 8 | 79.0 | 2.35 | 0 |
| D | 2 | 84.8 | 2.32 | 0 |

Carrier A gave rise to such a serious degree of "carrier deposition onto photoconductor" that there were many missing letters even in the initial stage of the continuous copying test. Carrier A was found to be unacceptable. Though Carrier B showed a relatively low degree of "carrier deposition", the Se photosensitive plate was seriously damaged and the quality of the produced copies deteriorated to a remarkable extent after continuous printing of 10,000 copies. On the other hand, Carriers C and D gave invariably clear copies even after continuous printing of 50,000 copies. Carriers C and D were found to be very durable.

EXAMPLE 2

Three samples of spherical magnetic powders having different surface porosities were prepared. Each of the samples had a particle diameter of 75–150 μm.

For each of the samples, the relationship between the surface porosity and the quantity of the coating resin required for obtaining substantially the same order of electrical properties was determined by measuring the current passing through the sample (representing the resistivity) at a potential of 100 volts (D.C.). The results are summarized in Table 2.

TABLE 2

| Surface Porosity (vol. %) | Required Quality of Coating Resin (ratio) | Current mA at 100 V |
|---|---|---|
| 3 | 1.0 | 0.6 |
| 9 | 1.0 | breaking down of coating |
|   | 2.0 | 0.83 |
|   | 3.0 | 0.33 |
| 20 | 1.0 | breaking down |
|   | 2.0 | breaking down |
|   | 3.0 | 0.9 |

It will be seen that the higher the surface porosity of the magnetite, the larger the amount of coating resin that is required for obtaining a certain desired level of electrical resistivity.

What is claimed is:

1. An electrophotographic carrier powder comprising magnetite with a substantially spherical particle shape, characterized in that the carrier powder has a particle diameter of from 30 to 200 μm, contains less than 10% by weight of wustite (FeO) and has a surface porosity of less than 20%.

2. An electrophotographic carrier powder according to claim 1, characterized in that the carrier powder contains less than 3% by weight of wustite (FeO).

3. An electrophotographic carrier powder according to claim 1 characterized in that the carrier powder has a surface porosity less than 10%.

4. An electrophotographic carrier powder according to claim 1 characterized in that the particle surfaces of the carrier powder are oxidized.

5. An electrophotographic carrier powder according to claim 1 characterized in that the particle surfaces of the carrier powder are coated with a resinous material.

6. An electrophotographic carrier powder according to claim 2, characterized in that the carrier powder has a surface porosity less than 10%.

7. An electrophotographic carrier powder according to claim 2, characterized in that the particle surfaces of the carrier powder are oxidized.

8. An electrophotographic carrier powder according to claim 3, characterized in that the particle surfaces of the carrier powder are oxidized.

9. An electrophotographic carrier powder according to claim 2, characterized in that the particle surfaces of the carrier powder are coated with a resinous material.

10. An electrophotographic carrier powder according to claim 3, characterized in that the particle surfaces of the carrier powder are coated with a resinous material.

11. An electrophotographic carrier powder according to claim 4, characterized in that the particle surfaces of the carrier powder are coated with a resinous material.

* * * * *